(No Model.)

S. J. KIRK.
LATHE CHUCK.

No. 255,173. Patented Mar. 21, 1882.

Witnesses.
Chas. L. Burdett
Geo. M. Smith.

Inventor
Samuel J. Kirk.
By Wm. E. Simonds

UNITED STATES PATENT OFFICE.

SAMUEL J. KIRK, OF WINDSOR LOCKS, CONNECTICUT, ASSIGNOR TO THE E. HORTON & SON COMPANY, OF SAME PLACE.

LATHE-CHUCK.

SPECIFICATION forming part of Letters Patent No. 255,173, dated March 21, 1882.

Application filed June 28, 1881. (No model.)

*To all whom it may concern:*

Be it known that I, SAMUEL J. KIRK, of Windsor Locks, in the county of Hartford and State of Connecticut, have invented a certain new and useful Improvement in Lathe-Chucks, of which the following is a description, reference being had to the accompanying drawings, where—

Figure 1:
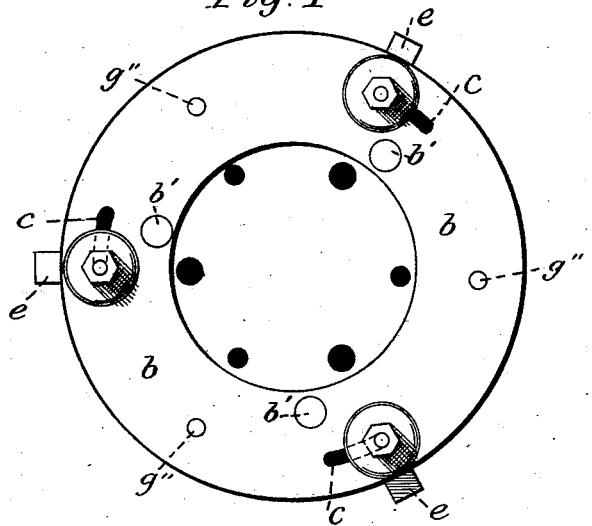
Figure 2:
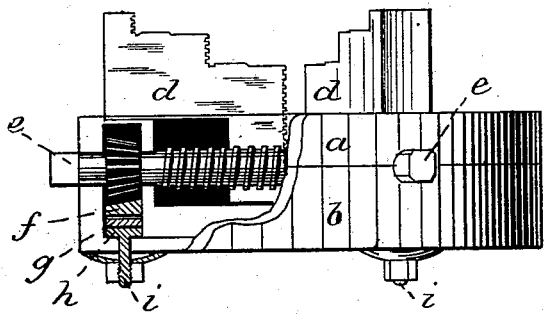
Figure 3:
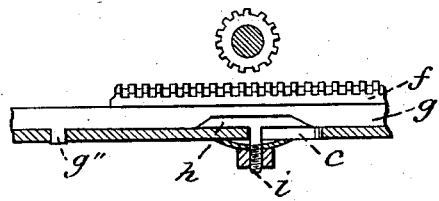
Figure 4:
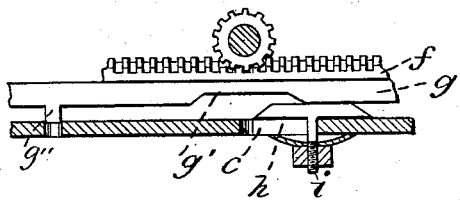

Figure 1 is a view of the back of a chuck embodying my invention. Fig. 2 is a side view of same with a part cut away to show interior of chuck-body. Fig. 3 is a view on a plane parallel to the axis of the chuck, showing a pinion and the loose annular gear out of mesh. Fig. 4 is a view of same with pinion and loose annular gear in mesh.

My invention relates to that class of lathe-chucks known as "universal" and "independent;" and it consists of the devices used, as herein described, for throwing into and out of gear the loose annular gear and the pinions appurtenant to threaded shafts used for moving the jaws.

The chuck is made in two parts, chuck-body half $a$ and chuck-body half $b$, held together by screws $b'$.

The letter $d$ denotes the jaws, provided on the back with nuts, which run on the threaded and pinion-bearing radial shafts $e$, the outer ends of which are squared for the application of a wrench.

In an annular groove in chuck-body half $b$ are placed beveled cams $h$, (opposite to each jaw,) having operating-pins $i$, which project through the slots $c$ and afford a hold for moving the cams. On these cams lies the adjusting-ring $g$, provided with cam-mortises $g'$, (corresponding to cams $h$,) and guide-pins $g''$, which move in suitable holes in chuck-body half $b$ and allow only axial play of the ring $g$. Between the ring $g$ and the pinions is placed the annular gear $f$, having axial play of about the thickness of the cams $h$.

The operation of my device is as follows: When the chuck is to be used on work requiring the jaws to be moved to unequal distances from the center (as an independent chuck) the pinion and annular gear are unmeshed by moving the cam $h$ in the slot $c$ until it is opposite the mortise $g'$, as shown in Fig. 3. When the cams are moved between the back of the chuck and the adjusting-ring, as in Fig. 4, the annular gear and pinions are in mesh, and by turning one shaft all will be turned and the chuck used as a universal chuck.

I am aware that a loose ring and also an annular gear, singly and in combination, have been used in chucks and operated by various devices for changing the chuck from one form (as independent) to the other (universal) and the reverse, and these I do not broadly claim.

I claim as my invention—

In a chuck of the character hereinbefore described, the combination of the annular gear $f$, adjusting-ring $g$, provided with cam-mortises $g'$ and guide-pins $g''$, chuck-body half $b$, having slots $c$, and cams $h$, provided with operating-pins $i$, all substantially as set forth.

SAMUEL J. KIRK.

Witnesses:
CHAS. L. BURDETT,
W. E. SIMONDS.